(12) United States Patent
Bacher et al.

(10) Patent No.: US 9,606,827 B2
(45) Date of Patent: Mar. 28, 2017

(54) SHARING MEMORY BETWEEN GUESTS BY ADAPTING A BASE ADDRESS REGISTER TO TRANSLATE POINTERS TO SHARE A MEMORY REGION UPON REQUESTING FOR FUNCTIONS OF ANOTHER GUEST

(71) Applicant: International Business Machines Corporation, Armonk, NY (US)

(72) Inventors: Utz Bacher, Schoenbuch (DE); Dominik Dingel, Boeblingen (DE); Thomas P. Grosser, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/666,566

(22) Filed: Mar. 24, 2015

(65) Prior Publication Data

US 2016/0283258 A1    Sep. 29, 2016

(51) Int. Cl.
 *G06F 9/455* (2006.01)
 *G06F 13/16* (2006.01)
(52) U.S. Cl.
 CPC ...... *G06F 9/45558* (2013.01); *G06F 9/45545* (2013.01); *G06F 13/1663* (2013.01); *G06F 2009/45583* (2013.01)
(58) Field of Classification Search
 CPC .............. G06F 9/45558; G06F 13/1663; G06F 9/45545; G06F 2009/45583
 See application file for complete search history.

(56) References Cited

U.S. PATENT DOCUMENTS

| 7,222,332 | B2 | 5/2007 | Gschwind et al. |
| 7,539,987 | B1 * | 5/2009 | Dey .................... G06F 9/45533 718/1 |
| 8,195,897 | B2 | 6/2012 | Patwari et al. |
| 8,463,980 | B2 | 6/2013 | Post et al. |
| 8,782,646 | B2 | 7/2014 | Anand et al. |
| 2005/0086656 | A1 | 4/2005 | Whitlock et al. |
| 2005/0114855 | A1 * | 5/2005 | Baumberger ....... G06F 9/45558 718/1 |

(Continued)

FOREIGN PATENT DOCUMENTS

| WO | 2008152967 A1 | 12/2008 |
| WO | 2014140953 A1 | 9/2014 |

OTHER PUBLICATIONS

U.S. Appl. No. 14/930,697, filed Nov. 3, 2015.

(Continued)

*Primary Examiner* — Abdullah Al Kawsar
*Assistant Examiner* — Jorge A Chu Joy-Davila
(74) *Attorney, Agent, or Firm* — Maeve L. Carpenter; William H. Hartwell

(57) ABSTRACT

In an approach to sharing memory between a first guest and a second guest both running on a data processing system, one or more computer processors provide a virtual device to a first guest for proxying memory accesses between the first guest and a second guest, where the first guest is associated with the second guest, and where the first guest is running a first operating system and the second guest is running a second operating system. The one or more computer processors send one or more device related functions to the second guest, wherein the virtual device enables sharing memory between the first guest and the second guest.

16 Claims, 3 Drawing Sheets

(56) References Cited

U.S. PATENT DOCUMENTS

| | | | |
|---|---|---|---|
| 2005/0246505 A1* | 11/2005 | McKenney | G06F 9/52 |
| | | | 711/151 |
| 2008/0072223 A1* | 3/2008 | Cowperthwaite | G06F 9/4403 |
| | | | 718/1 |
| 2010/0031325 A1 | 2/2010 | Maigne et al. | |
| 2011/0113426 A1 | 5/2011 | Kung et al. | |
| 2013/0174148 A1* | 7/2013 | Amit | G06F 9/45558 |
| | | | 718/1 |

OTHER PUBLICATIONS

List of IBM Patents or Patent Applications Treated as Related (Appendix P), filed herewith.

Chen et al., "A Fast RPC System for Virtual Machines", IEEE Transactions on Parallel and Distributed Systems, vol. 24, No. 27, Jul. 2013, pp. 1267-1276.

German Counterpart Application 102016105381.3, Filed Mar. 22, 2016.

\* cited by examiner

SHARING MEMORY BETWEEN GUESTS BY ADAPTING A BASE ADDRESS REGISTER TO TRANSLATE POINTERS TO SHARE A MEMORY REGION UPON REQUESTING FOR FUNCTIONS OF ANOTHER GUEST

BACKGROUND OF THE INVENTION

The present invention relates generally to the field of data processing systems, and more particularly to a method, system and computer program product for sharing memory between two virtualized systems running on a data processing system.

A virtualized data processing system can provide multiple views on real and emulated resources of that processing system. Such a view can be implemented as virtual machines or so-called guests. Each guest operates as a virtual separate data processing system independent of other guests. The component providing the view of independent data processing systems is called a hypervisor. The areas of responsibility of the hypervisor include resource management, emulating, if necessary, and isolation between guests.

Occasionally guests encounter a need to collaborate on a task, e.g. one guest should analyze data for another guest. In general, this communication is handled by copying data between two guests over a virtual network. This allows facilitation of well-known programming paradigms. With this approach security and isolation of guests still can be maintained on a high level.

SUMMARY

Embodiments of the present invention disclose a method, a computer program product, and a system for sharing memory between a first guest and a second guest both running on a data processing system. The method may include one or more computer processors providing a virtual device to a first guest for proxying memory accesses between the first guest and a second guest, where the first guest is associated with the second guest, and where the first guest is running a first operating system and the second guest is running a second operating system. The one or more computer processors send one or more device related functions to the second guest, wherein the virtual device enables sharing memory between the first guest and the second guest.

Further, a computer program product for sharing memory between a first guest and a second guest both running on a data processing system may include program instructions to provide a virtual device to a first guest for proxying memory accesses between the first guest and a second guest, where the first guest is associated with the second guest, and where the first guest is running a first operating system and the second guest is running a second operating system. The program instructions send one or more device related functions to the second guest, wherein the virtual device enables sharing memory between the first guest and the second guest.

Further, a data processing system for execution of a data processing program is proposed, comprising computer readable program instructions for performing a method described above.

DETAILED DESCRIPTION

Figure 1:
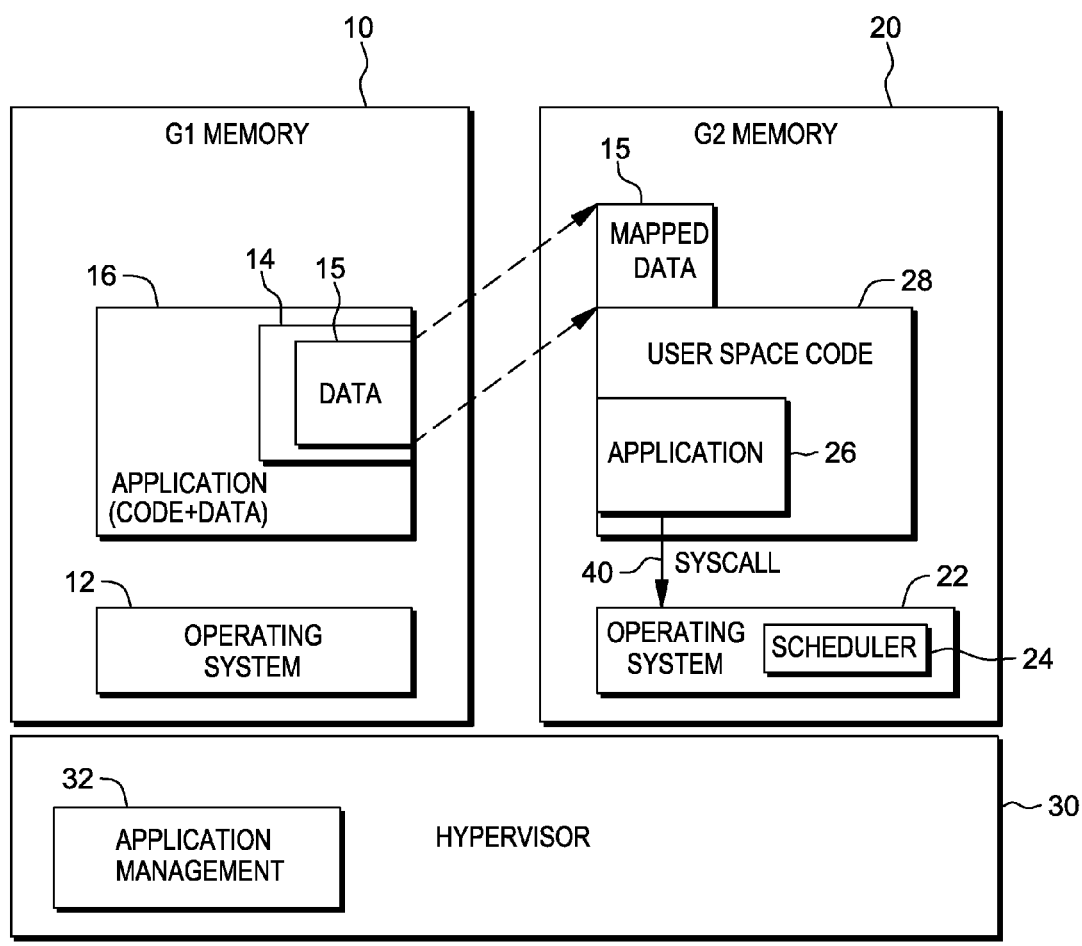
FIG. 1 is a system diagram of an environment in which a method according to an embodiment of the invention is implemented.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for sharing memory between guests. The illustrative embodiments are sometimes described herein using particular technologies only as an example for the clarity of the description. The illustrative embodiments may be used for sharing memory between a first guest and a second guest, the first guest running a first operating system and the second guest running a second operating system, where the two operating systems could be the same one, but could also be different operating systems.

In a virtual system, both an application running on the first guest and an application running on the second guest are hosted by the same hypervisor (i.e. the same physical machine). Due to an embodiment of the invention, a mechanism is provided to share data between the two guests, allowing the second guest to operate on data of the first guest.

The first guest identifies the data to be made available to the second application and invokes the second application on the second guest. The data for this call is mapped into the address space of the second application by the hypervisor for immediate access. While processing, the second application consumes the resources of the second guest (e.g. CPU, memory, I/O) and still accesses the data provided by the first guest directly. Translation of addresses of the provided data allows programming of second applications using higher level languages.

In recent developments, compute-intensive parts of the applications are moved to operating systems with low overhead to perform more cost-effective computation. According to the proposed method it is possible to avoid copy operations to move in-memory data structure from one operating system to another operating system. Mechanisms like remote procedure call (RPC), TCP/IP sockets, or even remote direct memory access (RDMA), which have to perform copy operations, causing latencies are not needed to be used.

Eliminating this overhead improves the overall performance of an application significantly. An encapsulation of functionality is possible without requiring significant changes in an operating system or the application. There is no communication overhead when sharing memory according to an embodiment of the invention. The amount of data shared is performance irrelevant for a call of service functions, because there are no copy operations needed for sharing memory. Sharing memory may be achieved by a function call from a guest to another guest.

FIG. 1 depicts a system diagram of an environment, in which a method according to an embodiment of the invention is implemented. The system diagram shows first guest 10 and second guest 20, depicted in the FIG. 1 as their memory regions, where hypervisor 30 is assigned to both first guest 10 and second guest 20, and thereby associates first guest 10 with second guest 20. First guest 10 is running first operating system 12, e.g., a common mainframe operating system, with first application 16, which incorporates application specific data 15. First operating system 12 may include a kernel that can discover applications on second guest 20. Second guest 20 is running second operating system 22, e.g., Linux®, with second application 26, for example, an application assist cartridge (AAC) as in FIG. 1, but which may represent any analytical algorithm. Second application 26 is running as one application of user space code 28 of second guest 20. Hypervisor 30 contains management module 32 for all collaboration specifics. Application management module 32 can manage the interaction between first guest 10 and second guest 20 regarding the usage of service functions and applications, such as AAC. System call 40 (SYSCALL) may be used for registering second application 26 with second operating system 22.

The proposed method for sharing memory between first guest 10 and second guest 20 is used for data 15 of first guest 10, to be used and operated on by second guest 20 without copying data 15 physically to second guest 20. Instead second application 26 may operate with data 15 by using a function call from first guest 10 to second guest 20 requesting some services of second application 26, e.g., AAC service functions.

According to the proposed method, hypervisor 30 provides virtual device 14 with a direct memory access. Then first guest 10 may announce the memory regions containing data 15 to virtual device 14 and start calling device specific functions on that data. Next hypervisor 30 may map the previously announced memory regions on top of the already available memory regions of second guest 20 and dispatch device related functions to second guest 20. In this way, first guest 10 and second guest 20 are enabled to share the memory via virtual device 14, as virtual device 14 can proxy memory accesses between first guest 10 and second guest 20.

Virtual device 14 may be configured with Peripheral Component Interconnect (PCI) device semantics. Thus memory regions may be announced to be used. Registers to pass data exist, for computational purposes, as well as for pointers to memory regions. Interrupt mechanisms may be used for completion and failures in operation.

Thus it is possible to use the services of second application 26 in the way of a commonly used external board with the functionality of second application 26 to be used by first application 16, where second application 26 may operate on data 15 of first application 16 and modify data 15. In this way the functionality of the code of second application 26 is offered to data 15 of first application 16.

When the service functions of second application 26 are working with memory regions, the code of the service functions may contain definitions when memory regions are accessed. Compiler/special data structures may translate addresses in memory region accesses. The code further realizes pointer arithmetics within the memory region. Second guest 20 gets a base offset for the memory region passed by first guest 10.

A base address register of virtual device 14 may be adapted to translate pointers of first guest 10 to pointer locations in second guest 20 in order to use correct memory data. This may be implemented by, for example, a C++ encapsulation of the data type, or a change of compiler pointer arithmetics of memory region based data.

Access to second guest 20 may be controlled by a request queue of scheduler 24 in second operating system 22. This may be useful if a number of guests are operating on a data processing system with a number of services being announced. Scheduler 24 may be operating as part of a kernel of second operating system 22.

Mapping of the memory of first guest 10 may be implemented as a read-only mapping, such that second guest 20 may only read data 15, and only first guest 10 is allowed to write on data 15. This may become important for safety relevant systems. The write protection of the memory area of second guest 20 may be requested by first guest 10 and enforced by hypervisor 30.

Hypervisor 30 may provide information on statistical use of functions of second guest 20. This is enabled by the managing function of hypervisor 30 gathering usage information from all services and guests involved in using data and services. This information may be used for billing purposes, monitoring, tracing for debugging, logging, and the like.

Figure 2:
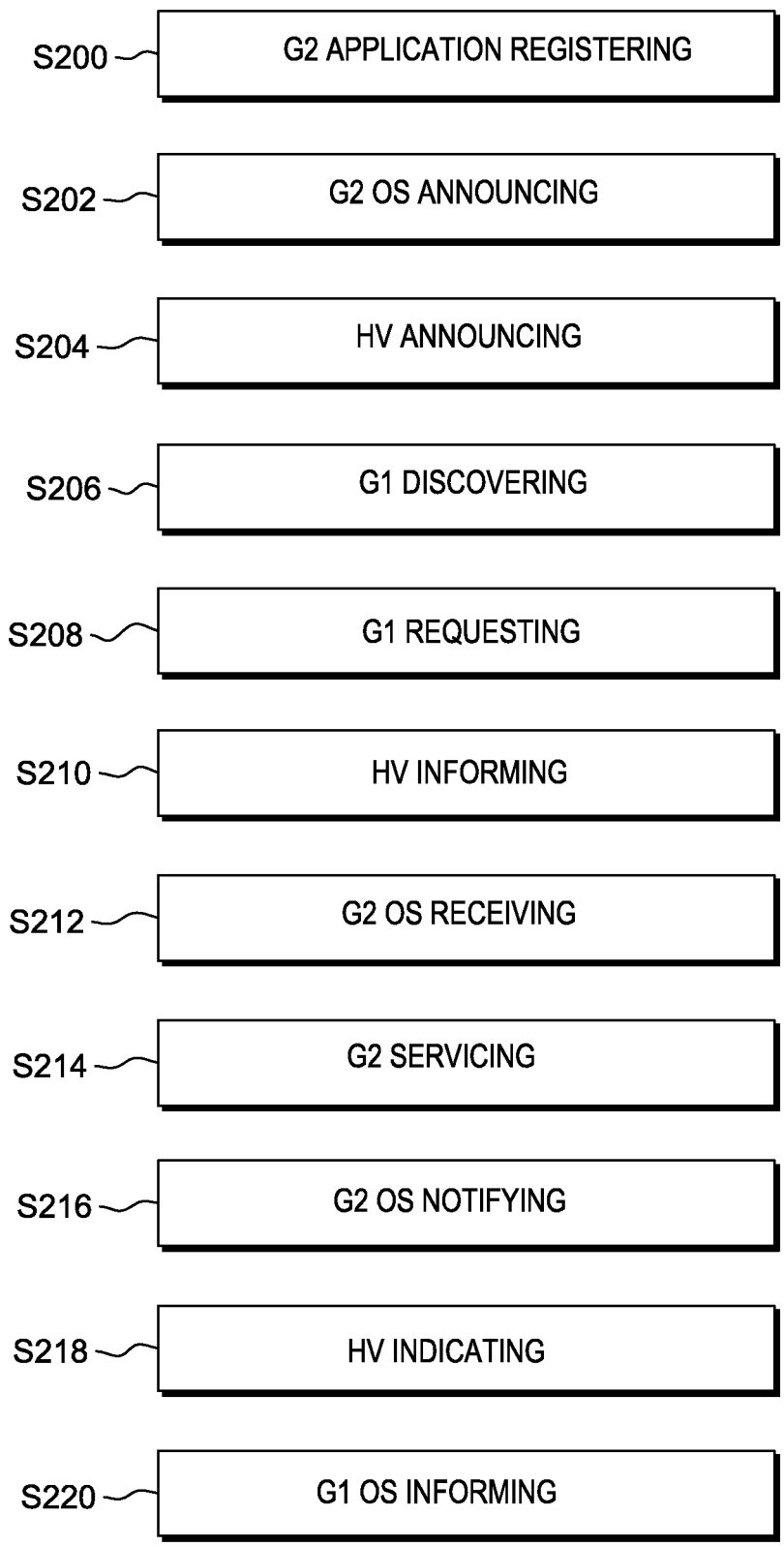
FIG. 2 is a flowchart of an exemplary process of the method for sharing memory between a first guest and a second guest according to an embodiment of the invention.

FIG. 2 depicts a flowchart of an exemplary process of the method for sharing memory between first guest 10 and second guest 20 according to an embodiment of the invention. Data 15 may be shared between first application 16 running on first guest 10 and second application 26 running on second guest 20, comprising the steps explained in FIG. 2.

First in step S200, second application 26 running on second guest 20 is registered with second operating system 22 in order to provide service functions, which may be called by other entities. Second application 26, e.g., AAC, of second guest 20 announces the service functions, along with an identification token through a system call. A kernel of second operating system 22 then knows that the service functions are served by second application 26. Second application 26 announces its readiness to serve a service function through a blocking system call 40: the code of second application 26 will not be executed any further but hangs until the kernel schedules second application 26 again (triggered by an external event), returning from system call 40. Any scheduling characteristics for this service function, e.g., which processors to run on or what priority to use, are derived from the attributes of second application 26. If several instances of a service function are to be serviced in parallel, several threads may issue the blocking system call 40. If different services of the service function are to be offered, several processes may run this logic on per AAC base.

Next in step S202, second operating system 22 announces availability of the service functions to hypervisor 30. A special paravirtualized interrupt is injected into second guest 20 by hypervisor 30 on behalf of another consumer of that service, as soon as the consumer requests execution of that service function. In one embodiment, second operating system 22 registers an interrupt handler with hypervisor 30 for service functions, such as AAC requests. The kernel of second operating system 22 uses a hypervisor call, e.g., a paravirtualized instruction, to announce availability. The kernel revokes the service function announcement from hypervisor 30 as soon as second application 26 denounces the service function, or when second application 26 terminates.

In step S204, hypervisor 30 announces the service functions to first guest 10. Hypervisor 30 accepts the service function registration from second operating system 22 and offers the AAC to some or all other guests. Other guests can probe, or transmit queries, for active service functions and consume them. Policies, isolation/multi-tenancy, backlog, priorities, and access restrictions can apply. A standard service location protocol may be used to implement the registry and discovery mechanism.

Next in step S206, first application 16 running on first guest 10 determines the service functions are available by discovering the announcement by hypervisor 30. Service location mechanisms may be used as provided by step S204. If first guest 10 intends to use a service function, then first guest 10 may ask hypervisor 30 to make the service function available. If first operating system 12 of first guest 10 discovered the service function first, then first operating system 12 can enable discovery to its applications. Hypervisor 30 makes the service function as virtual (PCI) device 14 available, e.g., via hot-plugging virtual device 14 to first guest 10. First operating system 12 may optionally restrict user space access to service functions.

In step S208, first application 16 requests the service functions from hypervisor 30. Parameters from first application 16 may be passed as "call-by-value" parameters to second guest 20. First application 16 announces a call back function to be called on completion of the service function. First application 16 can announce regions of its memory area for direct access by the service function. First application 16 invokes the service of the service function asynchronously, i.e., system call 40 is non-blocking, first application 16 continues to run, and first application 16 is notified, i.e., called back on a previously registered call back function, when the service function completes. First operating system 12 passes the service function request to hypervisor 30.

Then in step S210, hypervisor 30 informs second guest 20 of the request for the service functions by first application 16. Hypervisor 30 provides virtual device 14. Virtual device 14 carries an identifier of the requested service function and call-by-value parameters, e.g., in configuration space. Virtual device 14 also provides base address registers that second guest 20 can use to access the memory of first application 16 directly. Hypervisor 30 maps the announced memory of first guest 10 on top of the memory of second guest 20. The base address register may contain an offset of the memory region in the address space of first application 16.

Next in step S212, second operating system 22 of second guest 20 determines the request for service functions by hypervisor 30 on behalf of first application 16 has occurred by receiving the special paravirtualized interrupt. Second operating system 22 may then search for available service function processes, i.e., blocking processes that are ready to work on that service function. If none are found, but a service of a service function is present, then the service function may be queued for later processing. Second operating system 22 then maps memory regions as associated with the service function request into the address space of the process which will be working on the service function. Second operating system 22 also announces the base address and size of the memory of first guest 10 to the service function process of second guest 20. Second operating system 22 provides service function parameters to the AAC process, and schedules the service function process, returning from its blocking system call 40.

In step S214, second application 26 services the request from first application 16. Computation takes place until completion of the service function request. The exported memory region of first application 16 is mapped by hypervisor 30 into a process address space of second application 26. A base address register designates an offset of the memory region in the address space of first application 16. This may be used to follow pointers. Pointer dereferencing can either be done implicitly through compiler support, or explicitly through using specific code, e.g., via libraries. Upon completion, the service function code returns potential return data ("by value") in device registers of virtual device 14. In addition, direct updates to the memory of first guest 10 may have taken place. The service function process may inform second operating system 22 of renewed availability of service function processing capability, or terminate the service of the service function for that identification.

Next in step S216, second operating system 22 of second guest 20 notifies hypervisor 30 about the completion of the request. Second operating system 22 may withdraw access to the memory, e.g., removes the memory mapping, and may call hypervisor 30 to indicate completion of the service function. If another service function request is pending, the next service function request may be processed.

In step S218, hypervisor 30 indicates completion of the request to first operating system 12 of first guest 10. If hypervisor 30 realizes that the service function request is complete, then hypervisor 30 notifies first operating system 12 and indicates the completion to first guest 10, e.g., via interrupt on virtual device 14.

In step S220, first operating system 12 of first guest 10 informs first application 16 of the completion of the request. First operating system 12 calls a call-back function in the user space code of first guest 10 to provide an indication of the completion of the service function by notifying first application 16. The memory of first guest 10 has been updated directly during the process described in FIG. 2. Additional call-by-value return values are accessible through the virtual device registers.

Figure 3:
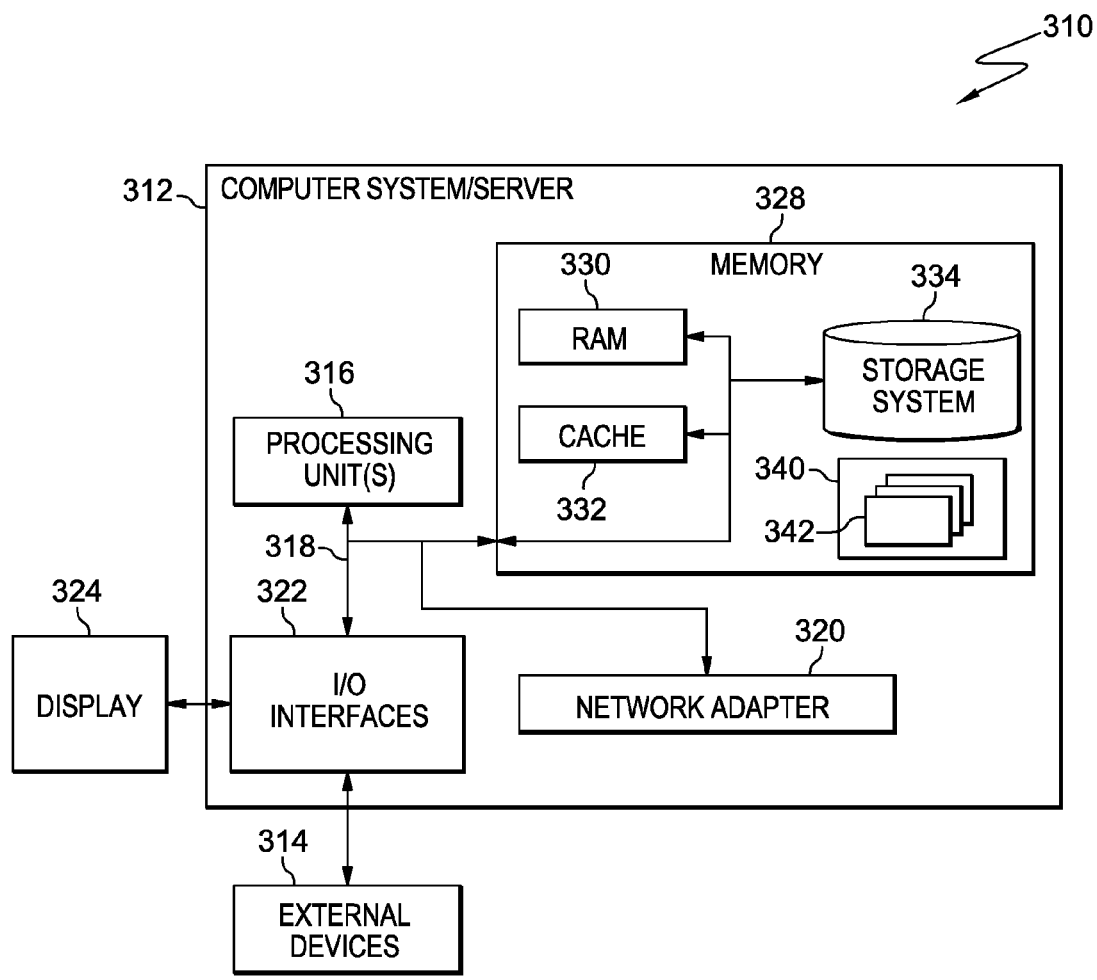
FIG. 3 is an example embodiment of a data processing system for executing the method according to the invention.

Referring now to FIG. 3, a schematic of an example of data processing system 310 is shown. Data processing system 310 is only one example of a suitable data processing system and is not intended to suggest any limitation as to the scope of use or functionality of embodiments of the invention described herein. Regardless, data processing system 310 is capable of being implemented and/or performing any of the functionality set forth herein above.

In data processing system 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in data processing system 310 is shown in the form of a general-purpose computing device. The components of computer system/server 312 may include, but are not limited to, one or more processors or processing unit(s) 316, a system memory 328, and a bus 318 that couples various system components including system memory 328 to processing unit(s) 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, system memory 328 may include at least one program product having a set (e.g., at least one) of program modules that are configured to carry out the functions of embodiments of the invention.

Program/utility 340, having a set (at least one) of program modules 342, may be stored in system memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via input/output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for sharing memory between a first guest and a second guest both running on a data processing system, the computer program product comprising:
   one or more computer readable storage medium and program instructions stored on the one or more computer readable storage medium, the program instructions executable by a computer to cause the computer to perform a method comprising:
   program instructions to receive announcement of availability of service functions of a second guest, wherein a second application running on the second guest registered with a second operating system provides the service functions;
   program instructions to send the announcement of availability of service functions of the second guest to a first guest, wherein a first application is running on the first guest registered with a first operating system;
   program instructions to, responsive to receiving a request for the service functions of the second guest from the first guest, map announced memory of the first guest on top of memory regions of the second guest, utilizing a base address register; and
   program instructions to adapt the base address register to translate pointers for one or more previously announced memory regions associated with service functions of the first guest to pointer locations in the memory regions of the second guest.

2. The computer program product of claim 1, further comprising program instructions, stored on the one or more computer readable storage medium, which when executed by a processor, cause the processor to:
   register the second application running on the second guest with the second operating system in order to provide service functions by a blocking system call.

3. The computer program product of claim 1, further comprising program instructions, stored on the one or more computer readable storage medium, which when executed by a processor, cause the processor to:
   call a paravirtualized function; and registering, by the one or more computer processors, an interrupt handler.

4. The computer program product of claim 1, wherein receiving a request for the service functions of the second guest from the first guest further comprises program instructions, stored on the one or more computer readable storage medium, which when executed by a processor, cause the processor to utilize a non-blocking system call.

5. The computer program product of claim 1, wherein mapping announced memory of the first guest on top of memory regions of the second guest is a read-only mapping.

6. The computer program product of claim 1, further comprising program instructions, stored on the one or more computer readable storage medium, which when executed by a processor, cause the processor to:
receive notification to the first application of the completion of the request from the first operating system of the first guest; and
provide a call-back function.

7. The computer program product of claim 1, further comprising program instructions, stored on the one or more computer readable storage medium, which when executed by a processor, cause the processor to:
control access to the second guest by a request queue of a scheduler in the second operating system.

8. The computer program product of claim 1, further comprising program instructions, stored on the one or more computer readable storage medium, which when executed by a processor, cause the processor to:
provide information regarding statistical use of functions of the second guest via a hypervisor.

9. A computer system for sharing memory between a first guest and a second guest both running on a data processing system, the computer system comprising:
one or more computer processors;
one or more computer readable storage device;
program instructions stored on the one or more computer readable storage device for execution by at least one of the one or more computer processors, the program instructions comprising:
program instructions to receive an announcement of availability of service functions of a second guest, wherein a second application running on the second guest registered with a second operating system provides the service functions;
program instructions to send the announcement of availability of service functions of the second guest to a first guest, wherein a first application is running on the first guest registered with a first operating system;
program instructions to, responsive to receiving a request for the service functions of the second guest from the first guest, map announced memory of the first guest on top of memory regions of the second guest, utilizing a base address register; and
program instructions to adapt the base address register to translate pointers for one or more previously announced memory regions associated with service functions of the first guest to pointer locations in the memory regions of the second guest.

10. The computer system of claim 9, further comprising program instructions, stored on the one or more computer readable storage devices, which when executed by a processor, cause the processor to:
register the second application running on the second guest with the second operating system in order to provide service functions by a blocking system call.

11. The computer system of claim 9, further comprising program instructions, stored on the one or more computer readable storage devices, which when executed by a processor, cause the processor to:
call a paravirtualized function; and registering, by the one or more computer processors, an interrupt handler.

12. The computer system of claim 9, wherein receiving a request for the service functions of the second guest from the first guest further comprises program instructions, stored on the one or more computer readable storage devices, which when executed by a processor, cause the processor to utilize a non-blocking system call.

13. The computer system of claim 9, wherein mapping announced memory of the first guest on top of memory regions of the second guest is a read-only mapping.

14. The computer system of claim 9, further comprising program instructions, stored on the one or more computer readable storage devices, which when executed by a processor, cause the processor to:
receive notification to the first application of the completion of the request from the first operating system of the first guest; and
provide a call-back function.

15. The computer system of claim 9, further comprising program instructions, stored on the one or more computer readable storage devices, which when executed by a processor, cause the processor to:
control access to the second guest by a request queue of a scheduler in the second operating system.

16. The computer system of claim 9, further comprising program instructions, stored on the one or more computer readable storage devices, which when executed by a processor, cause the processor to:
provide information regarding statistical use of functions of the second guest via a hypervisor.

* * * * *